United States Patent
Lin et al.

(10) Patent No.: US 8,459,918 B2
(45) Date of Patent: Jun. 11, 2013

(54) CAGE NUT FOR MOUNTING SERVER TO SERVER RACK

(75) Inventors: Chieh-Hsiang Lin, Tu-Cheng (TW); Huang-Jyun Lu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 257 days.

(21) Appl. No.: 13/070,464

(22) Filed: Mar. 23, 2011

(65) Prior Publication Data

US 2012/0134763 A1    May 31, 2012

(30) Foreign Application Priority Data

Nov. 30, 2010   (TW) ............................... 99141383 A

(51) Int. Cl.
*F16B 39/284* (2006.01)
(52) U.S. Cl.
USPC ........... 411/112; 411/111; 411/113; 411/173; 411/174; 411/432
(58) Field of Classification Search
USPC ................. 411/103, 111, 112, 113, 119, 172, 411/173–176, 430, 432
See application file for complete search history.

(56) References Cited

U.S. PATENT DOCUMENTS

| | | | | |
|---|---|---|---|---|
| 2,495,037 A * | 1/1950 | Tinnerman | .................... | 411/112 |
| 2,587,134 A * | 2/1952 | Flora | .............................. | 411/259 |
| 2,649,126 A * | 8/1953 | Tinnerman | .................... | 411/113 |
| 2,695,046 A * | 11/1954 | Tinnerman, III | .............. | 411/112 |
| 2,727,552 A * | 12/1955 | Chvesta | ........................ | 411/112 |
| 2,967,556 A * | 1/1961 | Jaworski | ........................ | 411/112 |
| 3,035,624 A * | 5/1962 | Jaworski | ........................ | 411/112 |
| 7,134,821 B2 * | 11/2006 | Clinch et al. | ................... | 411/171 |

\* cited by examiner

*Primary Examiner* — Roberta Delisle
(74) *Attorney, Agent, or Firm* — Altis Law Group, Inc.

(57) ABSTRACT

A cage nut includes a substantially rectangular base portion, two sidewalls, two stopper portions, two arm portions, two clamping portions, and a nut. The sidewalls extend from two opposite edges of the base portion. Each stopper portion extends from an end of a corresponding sidewall away from the base portion. The two stopper portions extend toward each other. Each arm portion extends outwardly from an end of a corresponding stopper portion. Each clamping portion extends from an end of a corresponding arm portion and includes a first side edge and a second side edge. The first side edge and the second side edge are arranged in an angle. The angle is equal to or less than about degrees. The clamping portions extend away from each other. The base portion, the two sidewalls and the two stopper portions define a receiving space. The nut is received in the receiving space.

12 Claims, 4 Drawing Sheets

CAGE NUT FOR MOUNTING SERVER TO SERVER RACK

BACKGROUND

1. Technical Field

The present disclosure relates to cage nuts and, particularly, to a cage nut which can be engaged with a screw to mount a server to a server rack.

2. Description of Related Art

A typical cage nut usually includes a nut and a cage member which wraps around the nut. The cage member usually includes a base portion and two sidewalls extending from the base portion. A pair of strip-shaped clamping portions extends outwardly from the two corresponding sidewalls. The width of the clamping portion along a direction parallel to the base portion is slightly less than the side of a square hole. The distance between the two clamping portions is usually slightly greater than the side of the square hole. When mounting the cage nut in the square hole, the two clamping portions are aligned to a pair of sides of the square hole, and then the clamping portions are pushed toward each other with the assistance of a tool such as a screwdriver to allow the clamping portions to pass through the square hole and then are released to let the clamping portions attach on the periphery of the square hole. However, it is not convenient to mount the cage nut into the square hole using a tool.

Therefore, it is desirable to provide a cage nut, which can overcome the abovementioned limitations.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present cage nut.

DETAILED DESCRIPTION

Embodiments of the present disclosure will now be described in detail with reference to the drawings.

Figure 1:
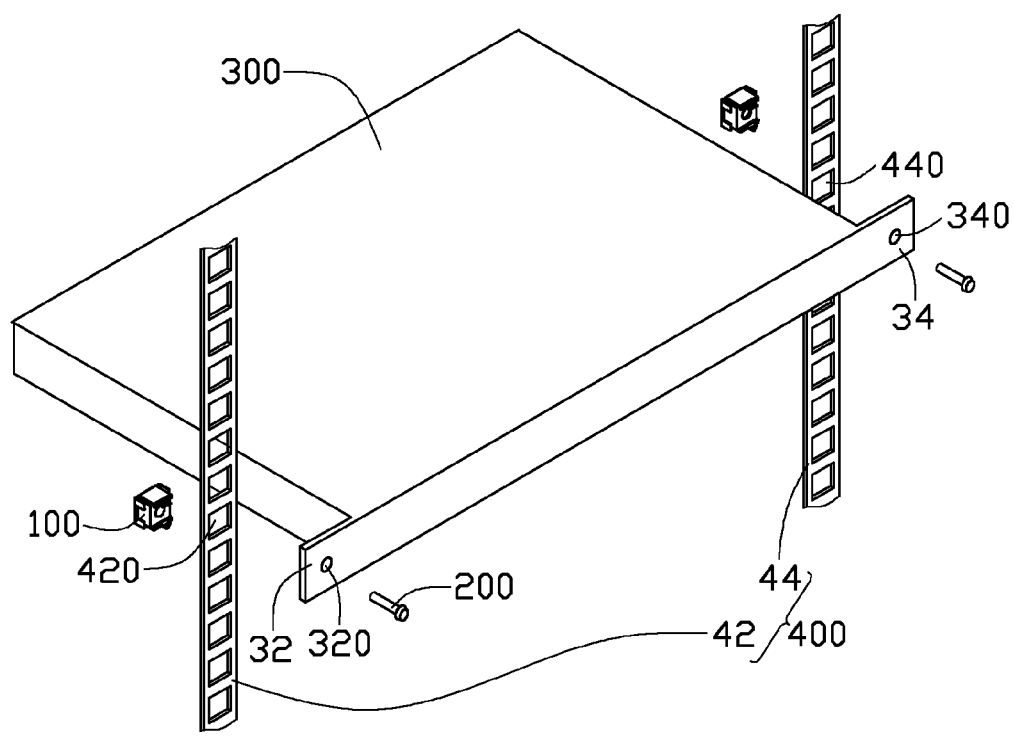
FIG. 1 is an isometric view of two cage nuts for mounting a server to a pair of mounting plates, according to an exemplary embodiment.

Referring to FIG. 1, two cage nuts 100, according to an exemplary embodiment, are configured for engaging with two screws 200 to mount a server 300 to a server rack 400.

The sever 300 has a first ear portion 32 and a second ear portion 34. The first ear portion 32 defines a first screw hole 320. The second ear portion 34 defines a second screw hole 340. The server rack 400 includes a first mounting plate 42 and a second mounting plate 44. The first mounting plate 42 defines a plurality of square holes 420. The second mounting plate 44 defines a plurality of square holes 440. For every square hole 420 there is a square hole 440 horizontally aligned with it. In the illustrated embodiment, each square hole 420 is identical to each square hole 440.

When mounting the server 300 to the server rack 400, the two cage nuts 100 are respectively mounted in one pair of the square holes 420, 440 from one side of the mounting plates 42, 44. The first ear portion 32 and the second ear portion 34 are respectively attached to the pair of square holes 420, 440 from the other side of the mounting plates 42, 44. Then, the two screws 200 are respectively extended through the first screw holes 320 and the second screw holes 340 to engage with the corresponding cage nuts 100.

Figure 2:
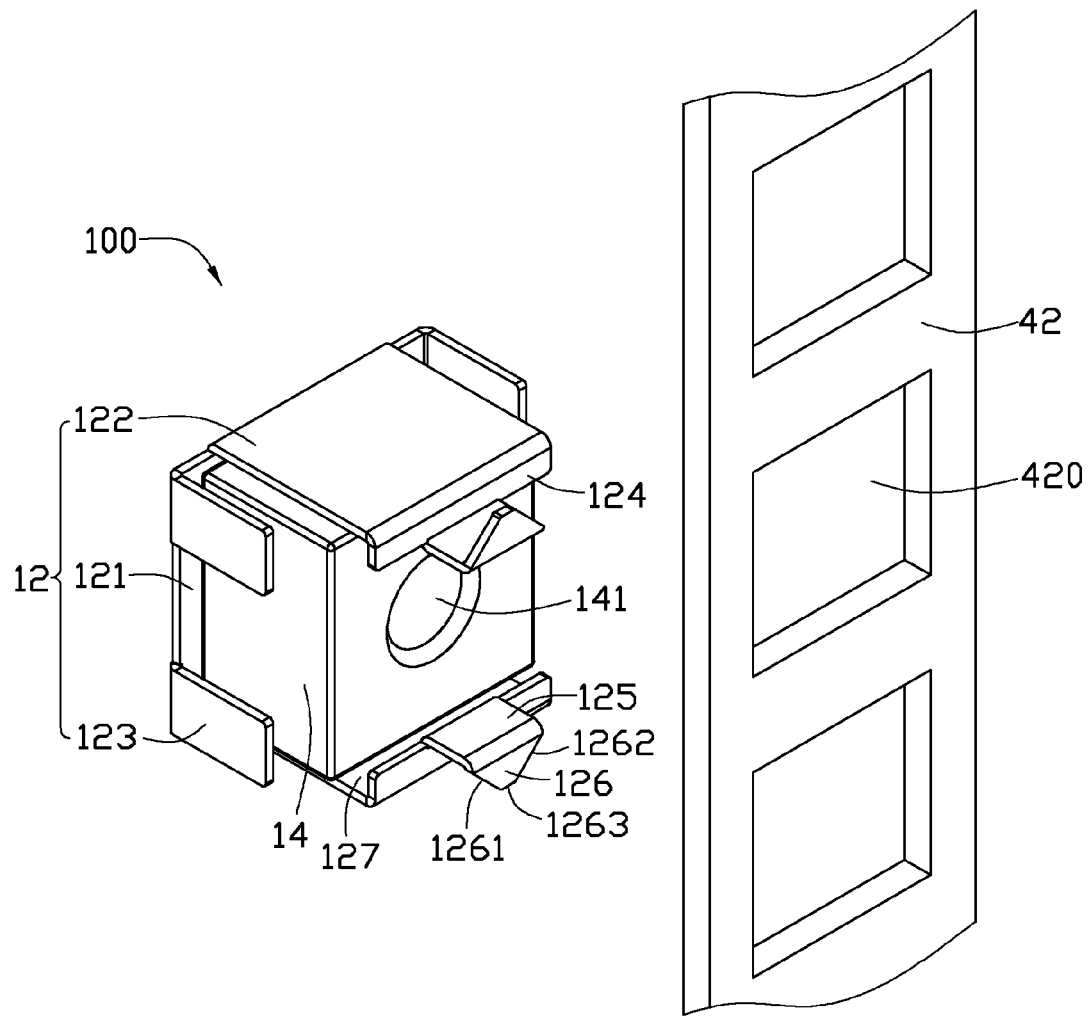
FIG. 2 is an isometric view of one of the cage nuts and one of the mounting plates of FIG. 1, showing the cage nut in a first state.

Referring to FIG. 2, the cage nut 100 includes a cage member 12 and a nut 14. The cage member 12 is made of a metal alloy by stamping. The cage member 12 includes a base portion 121, two sidewalls 122, and a plurality of limiting portions 123. The base portion 121 is generally a square plate and includes a pair of first edges and a pair of second edges. The two sidewalls 122 substantially perpendicularly extend from the pair of first edges. The two sidewalls 122 are parallel and opposite to each other. The distance between the two sidewalls 122 is greater than the side of the square hole 420. The limiting portions 123 substantially perpendicularly extend from the pair of second edges of the base portion 121. The length along the direction perpendicular to the base portion 121 of each limiting portion 123 is shorter than that of each sidewall 122. A generally rectangular-shaped stopper portion 124 extends from an end of a corresponding sidewall 122 away from the base portion 121. The two stopper portions 124 extend toward each other along a direction that is substantially parallel to the base portion 121.

An arm portion 125 extends outwardly from an end of a corresponding stopper portion 124 away from the corresponding sidewall 122. The two arm portions 125 are parallel to each other and perpendicular to the corresponding stopper portion 124. Each arm portion 125 is generally rectangular-shaped. The height of the arm portion 125 along the direction perpendicular to the base portion 121 is equal to or slightly greater than the depth of the square hole 420. The distance between the two arm portions 125 is equal to or slightly less than the side of the square hole 420.

A clamping portion 126 extends from an end of a corresponding arm portion 125 away from the corresponding stopper portion 124. The two clamping portions 126 extend away from each other. The two clamping portion 126 are substantially parallel to the base portion 121. Each clamping portion 126 is generally triangular-shaped and includes a first side edge 1261, a second side edge 1262, and a third side edge 1263. The first side edge 1261 and the second side edge 1262 connect to the arm portion 125. The third side edge 1263 connects between the first side edge 1261 and the second side edge 1262. The first side edge 1261 and the second side edge 1262 are extended intersection and form an angle therebetween. The distance between the two clamping portions 126 is greater than the side of the square hole 420 and less than the diagonal length of the square hole 420. The angle is equal to or less than about 90 degrees. In this embodiment, the angle is about 90 degrees. The two third side edges 1263 are parallel to each other. The distance between the two third side edges 1263 is greater than the side of the square hole 420 and less than the diagonal length of the square hole 420.

The nut 14 is generally a cubic block in shape and defines a screw hole 141 therein. The height of the nut 14 along the direction perpendicular to the base portion 121 is less than the sidewall 122. The nut 14 is received in a receiving space 127 cooperatively defined by the base portion 121, the two sidewalls 122, and the two stopper portions 124.

Figure 3:
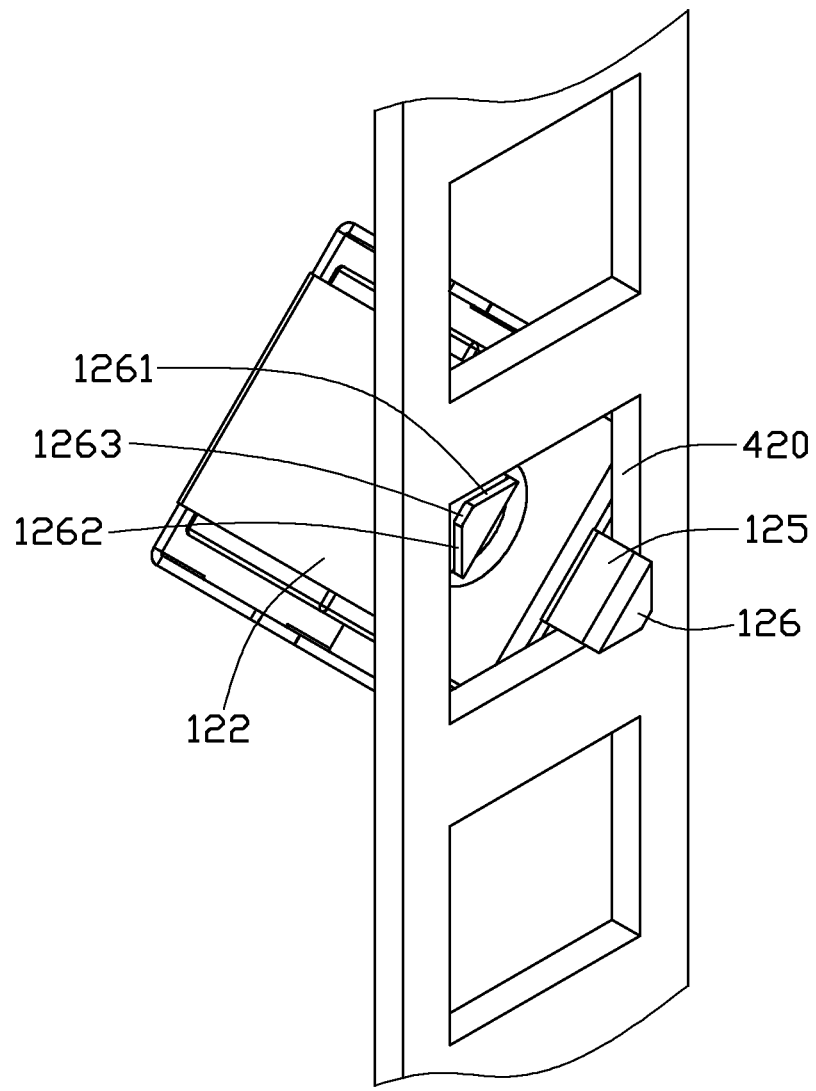
FIG. 3 is similar to FIG. 2, but showing the cage nut in a second state.
Figure 4:
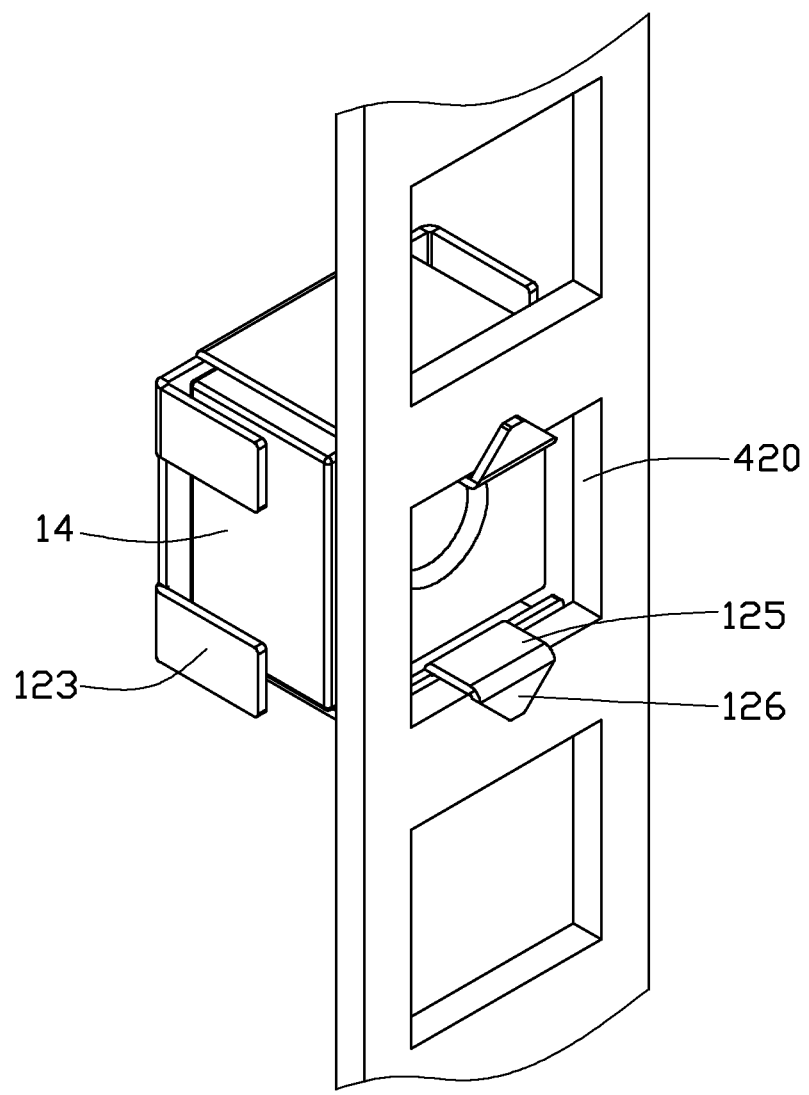
FIG. 4 is similar to FIG. 3, but showing the cage nut in a third state.

Referring to FIG. 3 and FIG. 4, when mounting the cage nut 100 in one of the square holes 420, the clamping portions 126 are aligned with corners of the square hole 420, and then the clamping portions 126 pass through the square hole 420 with the arm portions 125 received in the square hole 420.

Then the cage nut 100 is rotated about 45 degrees so that the clamping portions 126 can attach on the periphery of the square hole 420. Thus, the cage nut 100 is engaged with the square hole 420.

Understandably, when removing the cage nut 100 from the square hole 420, the cage nut 100 is rotated to align the clamping portion 126 with corners of the square hole 420. Thus, the cage nut 100 can be removed from the square hole 420.

It will be understood that each clamping portion 126 can only includes the first side edge 1261 and the second side edge 1262. The first side edge 1261 and the second side edge 1262 of each clamping portion 126 are intersected with each other and cooperatively form an intersection point. The distance between the two intersection points is greater than the side of the square hole 420 and less than the diagonal length of the square hole 420.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A cage nut for mounting a server to a server rack, the cage nut comprising:
   a substantially rectangular base portion;
   two sidewalls extending from two opposite edges of the base portion;
   two stopper portions, each stopper portion extending from an end of a corresponding sidewall away from the base portion, the two stopper portions extending toward each other, the base portion, the two sidewalls and the two stopper portions defining a receiving space;
   two arm portions, each arm portion extending outwardly from an end of a corresponding stopper portion;
   two clamping portions, each clamping portion extending from an end of a corresponding arm portion, each clamping portion comprising a first side edge and a second side edge, the first side edge and the second side edge being arranged in an angle, the angle being equal to or less than about 90 degrees, the two clamping portions extending away from each other and a distance between the two clamping portions is greater than a side of the square hole and less than a diagonal length of the square hole; and
   a nut received in the receiving space;
   wherein the clamping portions are configured to align with two corners of a square hole such that the clamping portions pass through the square hole without pushing the clamping portions toward each other.

2. The cage nut of claim 1, wherein each clamping portion further comprises a third side edge connecting between the first side edge and the second side edge, the two third side edges of the two clamping portions are parallel to each other.

3. The cage nut of claim 1, wherein the first side edge and the second side edge of each clamping portion are intersected with each other.

4. The cage nut of claim 1, wherein the angle is about 90 degrees.

5. The cage nut of claim 1, wherein the base portion is a square plate and comprises a pair of first edges and a pair of second edges, the two sidewalls perpendicularly extend from the first edges and are opposite to each other.

6. The cage nut of claim 5, comprising a plurality of limiting portions extending from the pair of second edges, the length of each limiting portion along a direction perpendicular to the base portion is shorter than that of each sidewall.

7. The cage nut of claim 1, wherein the nut is a cubic block in shape.

8. The cage nut of claim 1, wherein each of the stopper portions is rectangular-shaped, the two stopper portions are substantially parallel to the base portion.

9. The cage nut of claim 1, wherein the two arm portions are parallel to each other and perpendicular to the stopper portions, each of the arm portions is rectangular-shaped.

10. The cage nut of claim 1, wherein the two clamping portion are substantially parallel to the base portion, each of the clamping portions is triangular-shaped.

11. The cage nut of claim 2, wherein a distance between the two third side edges is greater than a side of the square hole and less than a diagonal length of the square hole.

12. The cage nut of claim 3, wherein the first side edge and the second side edge of each clamping portion cooperatively form an intersection point, a distance between two intersection points of the two clamping portions is greater than a side of the square hole and less than the diagonal length of the square hole.

* * * * *